Fig. 1

INVENTOR.
MILTON J. MINNEMAN
ATTORNEY

Fig. 4

July 18, 1950 — M. J. MINNEMAN — 2,515,464
DIRECT READING RADIO NAVIGATION SYSTEM
Filed April 26, 1947 — 5 Sheets-Sheet 4

Fig.5

INVENTOR.
MILTON J. MINNEMAN
BY C. D. Tuska
ATTORNEY

July 18, 1950

M. J. MINNEMAN 2,515,464

DIRECT READING RADIO NAVIGATION SYSTEM

Filed April 26, 1947

INVENTOR.
MILTON J. MINNEMAN
BY
ATTORNEY

Patented July 18, 1950

2,515,464

UNITED STATES PATENT OFFICE 2,515,464

DIRECT READING RADIO NAVIGATION SYSTEM

Milton J. Minneman, Camden, N. J., assignor to Radio Corporation of America, a corporation of Delaware Application April 26, 1947, Serial No. 744,239

9 Claims. (Cl. 343—103)

My invention relates to radio navigation systems and particularly to systems of the type utilizing the time difference in the propagation of radio pulses from synchronized ground stations.

Navigation systems of this type employ pairs of synchronized ground transmitting stations that emit radio pulses having a fixed time relation. Each pair of ground stations preferably transmits pulses at an assigned individual repetition rate for the purpose of station selection. The pulses are broadcast so that they may be received by means of equipments located in the aircrafts or ships whose positions are to be determined. By means of the receiving equipment, the operator on the craft determines the time difference between the pulses from the two transmitter stations of one pair as they arrive at the receiver. Since the radio pulses travel from the ground transmitters to the receiver at a known propagation rate (i. e., at the velocity of light), it is known that the position of the craft is at some point on a line corresponding to the time difference reading. By obtaining the time difference reading from a second pair of ground stations, a second line corresponding to the second time difference reading is obtained, and the intersect point of the two lines is the position of the craft. Special maps having the "time difference" lines printed thereon for the several pairs of ground stations are provided for use with the navigation system.

In order to measure the time difference in the arrival of successive pulses from a pair of ground stations, the receiving equipment is arranged to generate pulses at selected repetition rates. The pulses may be adjusted to have a definite time relation to time of arrival of the ground station pulses and are provided for the purpose of driving or synchronizing cathode-ray deflecting circuits. The deflecting circuits produce cathode-ray sweep traces on which the received ground station pulses are displayed.

For the purpose of selecting a particular pair of ground stations, the operator selects the particular pulse repetition rate for the driving or synchronizing pulses corresponding to the repetition period of the pulses transmitted from said pair whereby the deflecting circuits may be synchronized with the received pulses from the selected pair of ground stations. Thus a particular pair of ground stations is selected at the receiver apparatus by turning a station selection switch to the position indicated on the receiver panel for obtaining sweep synchronizing pulses having the same repetition period as that of the pulses being transmitted from the selected pair of ground stations. Now the received pulses from the selected pair of ground stations can be made to appear stationary on the cathode-ray sweep or trace whereas those received from the other pairs of ground stations will move along the same trace.

The pulses from the two transmitter stations of a selected pair will be referred to as A and B pulses, respectively, and the B pulse is identified in the present system as the pulse that occurs after or follows the mid-point of the other pulse period. In operation, the A and B pulses are displayed, respectively, first on two slow-sweep cathode-ray traces and then on two fast-sweep cathode-ray traces, thereby enabling the operator to adjust a plurality of delay or phase shift circuits so that the time difference between the pulses driving or synchronizing the cathode-ray deflecting circuits equal exactly the time difference between A and B pulses.

The adjustment for the display and alignment of the A and B pulses is accomplished by first setting the A pulse at the left end of the upper slow-sweep trace, when the receiving apparatus is switched to an operating position marked #1. The B pulse will then appear on the lower cathode-ray trace and a variable index marker may now be located under the B pulse, this being done by adjusting the several variable delay or phase shift circuits. The apparatus is then switched to a #2 fast-sweep operation position so that the A and B pulses appear on two fast-sweep traces, respectively. The starting time of the fast-sweep trace on which the B pulse appears coincides with the start of the variable index marker, while the starting time of the fast-sweep trace on which the A pulse appears, coincides with the start of the slow-sweep trace. Therefore, by further adjustment of the delay circuits, the adjustable fast-sweep wave is caused to start at the proper time to bring the A and B pulses into alignment. In order to insure exact alignment, the A and B pulses should be made to have the same amplitude, and an amplitude balance control circuit is provided for this purpose. After these adjustments have been made the time difference between the starts of the fast sweeps will exactly equal the time difference between the A and B pulses from the transmitters.

The present invention provides a method and system whereby this time difference may be determined accurately from the readings of counters that are mechanically coupled to the several delay or phase shift circuits, respectively. The readings of the three counters are in thousands, hundreds, and microsecond units.

It has previously been proposed to determine the time difference of the received pulses in navigation systems by calibrating the delay devices to obtain a direct reading in microseconds. It was found, however, that with the systems then available no precise reading could be obtained in this way. As a result, timing marks were provided so that they could be counted to determine the time difference within one or two microseconds, for example.

According to the present invention the system is so designed that a precise time difference reading may be taken directly from the delay or phase shift circuits. The design includes the use of a sine wave phase shifter that can be calibrated accurately in microseconds, and the use of pulse selecting circuits to which gating pulses are applied under the control of calibrated delay circuits, the entire combination having various important features that will be described hereinafter.

An object of the present invention is to provide an improved method of and means for determining the time difference between electrical pulses.

A further object of the invention is to provide improved receiving equipment for a radio navigation system of the type utilizing the propagation of radio pulses from pairs of synchronized ground stations.

A still further object of the invention is to provide an improved method of and means for indicating the time difference between radio pulses transmitted from synchronized ground stations.

A still further object of the invention is to provide an improved method of and means for obtaining a direct reading of the time difference between radio pulses transmitted from synchronized ground stations.

The invention will be better understood from the following description taken in connection with the accompanying drawing in which.

In the several figures, similar parts are indicated by similar reference characters.

The pulse generator and station selection circuit which will now be described under the headings The pulse generator unit and Count subtraction for station selection is the same as that described and claimed in application Serial No. 552,146, now Patent No. 2,450,360, issued September 28, 1948, filed August 31, 1944, in the name of Earl Schoenfeld and entitled Timing Marker and Station Selection Apparatus.

THE PULSE GENERATOR UNIT

Figure 1:
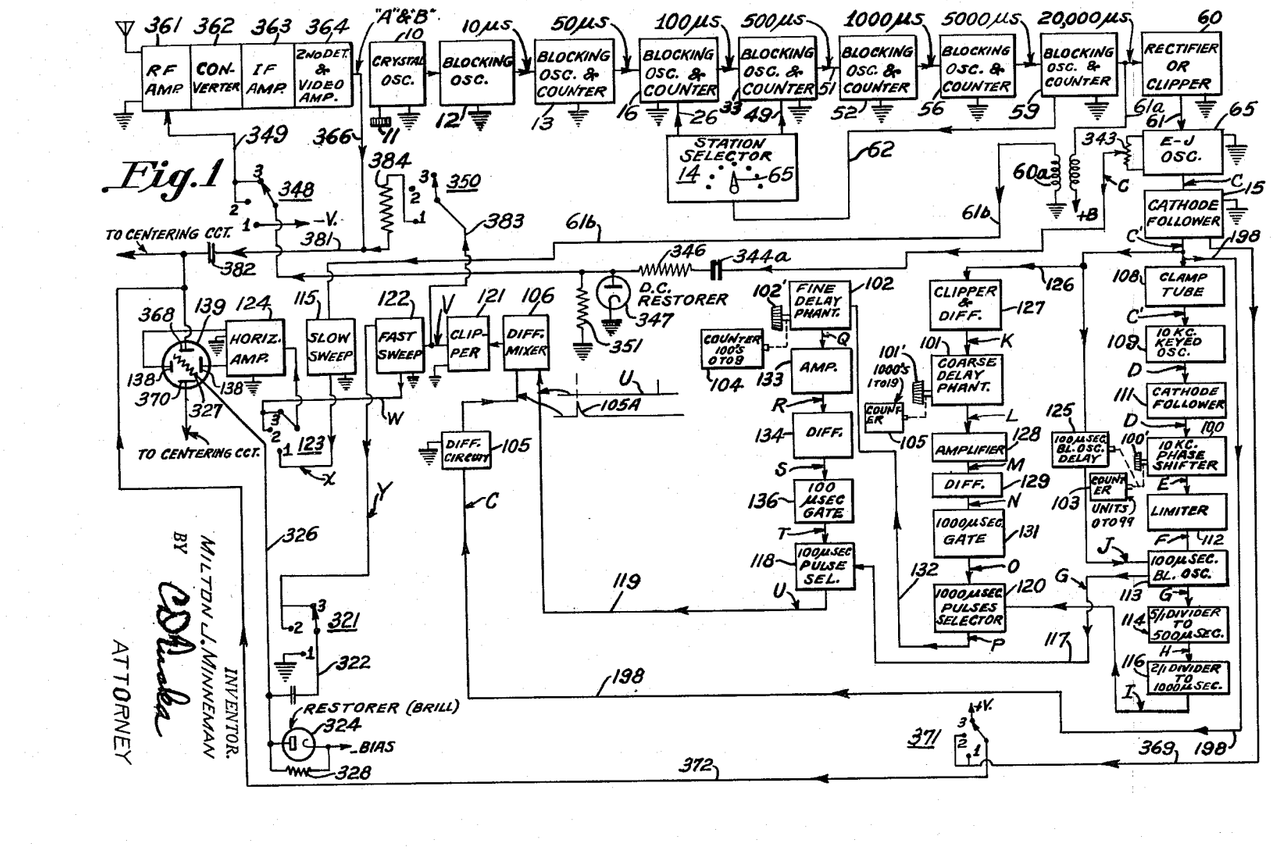
Figure 1 is a block and circuit diagram of navigation receiving apparatus designed in accordance with one embodiment of the invention.
Figures 2, 3:
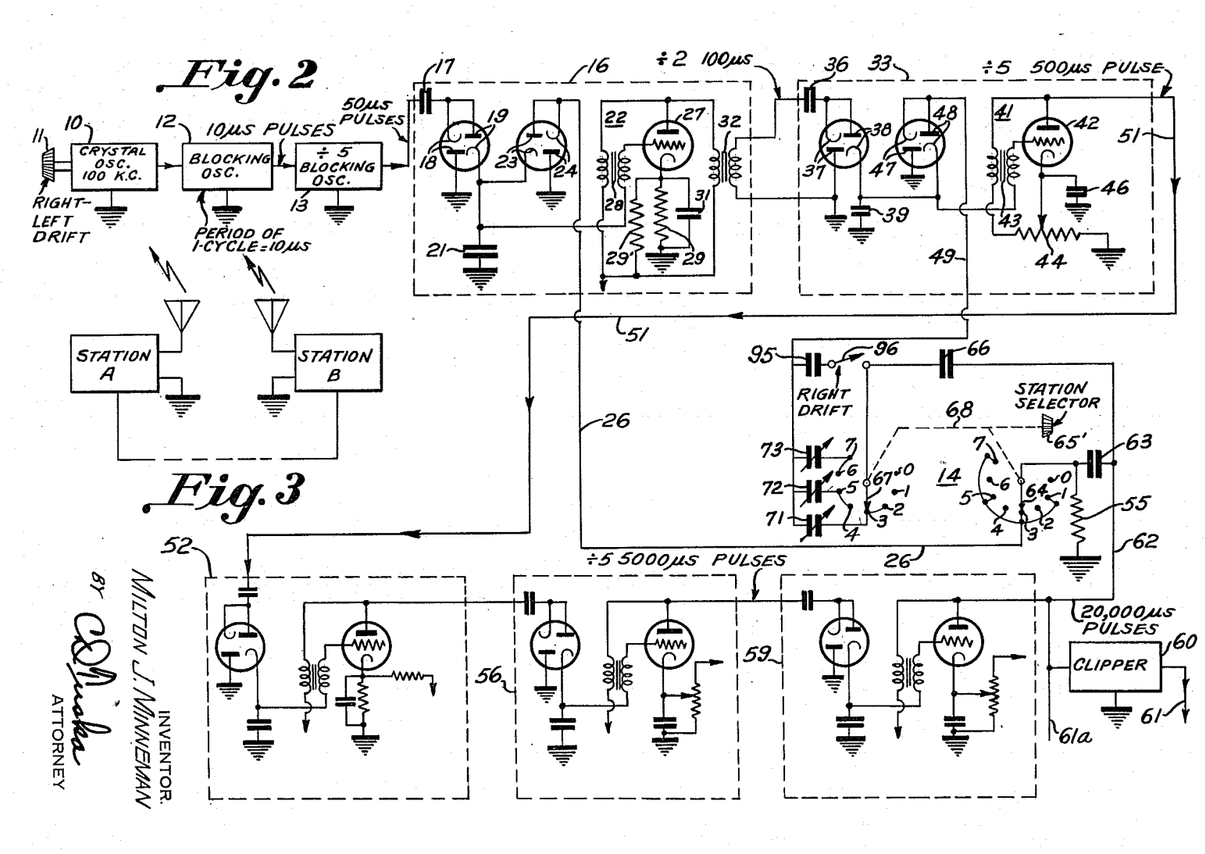
Figure 2 is a block and circuit diagram of the pulse generating unit shown in Fig. 1.
Figure 3 is a block diagram representing one pair of ground radio transmitter stations of the navigation system which transmit A and B pulses, respectively.

In Fig. 1, the pulse generating circuit for producing the controlling or synchronizing pulses that control the cathode-ray deflection is shown in block diagram at the top of the figure. It is shown in detail in Fig. 2. Referring to Figs. 1 and 2, the pulse generator comprises a crystal oscillator 10 that produces a sine wave voltage of stable frequency which in the example illustrated is 100 kilocycles per second, the repetition period being 10 microseconds. The frequency of the crystal oscillator output may be increased or decreased slightly by a manual adjustment as indicated at the control knob 11 for obtaining a "fine" right or left drift of a received pulse on a cathode-ray sweep trace, the rate of drift being slow enough to be useful on fast-sweep presentation.

The crystal oscillator 10 drives a blocking oscillator 12 or the like to produce periodic pulses which, in the present example, also recur at the rate of 100 kc. per second. The repetition period or time interval between successive pulses is, therefore, 10 microseconds.

The frequency of the 10 $\mu$s. pulses is divided by five by means of a suitable frequency divider 13 such as a second blocking oscillator to produce 50 $\mu$s. pulses. While specific values are being given for the several frequency division steps, the invention is not limited to these particular values.

The 50 $\mu$s. pulses are applied to a frequency divider 16 of the counter type described in White Patent 2,113,011. It divides the frequency by two to produce 100 $\mu$s. pulses. Also, an additional circuit is provided so that the divider 16 may be made to lose a "count" for the purpose of obtaining a different selected pulse repetition period.

The divider 16 (Fig. 2) comprises a counter circuit portion including an input or "bucket" capacitor 17, a pair of diodes 18 and 19, a "storage" capacitor 21 and a blocking oscillator portion 22. In addition, it includes a pair of diodes 23 and 24 associated with the storage capacitor 21 for the purpose of making the divider 16 lose a count upon the application of a pulse from a conductor 26 leading from a station selector switching circuit 14 as will be explained hereinafter. The blocking oscillator 22 comprises a vacuum tube 27 and a transformer 28 coupling the plate circuit to the grid circuit. The cathode circuit includes a biasing resistor 29, bypassed by a capacitor 31, and connected in series with a bleeder resistor 29'. A transformer 32 supplies the 100 $\mu$s. pulses from the divider 16 to a frequency divider 33 which also is of the type which may be made to lose one or more "counts."

The frequency divider 16 operates as follows: Each of the 50 $\mu$s. pulses of positive polarity from the oscillator 13 puts a predetermined charge on the comparatively large capacity storage capacitor 21 as a result of a pulse of current through the comparatively small "bucket" capacitor 17 and through the diode 19, the capacity of the capacitor 17 being small enough so that capacitor 17 receives full charge before the termination of an applied pulse. At the end of this current pulse, the capacitor 17 is discharged to ground potential through the diode 18. The next 50 μs. pulse puts an additional current pulse into capacitor 21, this raising the voltage across capacitor 21 sufficiently to trigger the blocking oscillator 22 whereby a pulse is produced across the transformer 28 as is well understood in the art. The pulse thus produced is applied to the divider 33 with positive polarity. At the same time, the blocking oscillator 22 discharges the capacitor 21 to bring it back to ground potential.

The frequency divider 33 divides the frequency by five to produce 500 μs. pulses. It includes a counter portion comprising a "bucket" capacitor 36, a pair of diodes 37 and 38, and a storage capacitor 39. It also includes a blocking oscillator portion 41 comprising a vacuum tube 42, a feedback transformer 43, a biasing resistor 44 and a bypass capacitor 46.

As in the preceding divider 16, there is provided in the divider 33 a pair of diodes 47 and 48 for subtracting counts. In the divider 33, however, the application of a pulse from a conductor 49 will subtract one, two, three or four counts depending upon the position of a switch arm 67 which is operated by a knob 65′ as well as the right-drift switch 96.

The 500 μs. pulses are supplied over a conductor 51 to a frequency divider 52 that divides by two to produce 1000 μs. pulses. The divider 52 is similar to the divider 16 with the count subtracting diodes omitted.

The 1000 μs. pulses are supplied to a frequency divider 56 that divides by five to produce 5000 μs. pulses which, in turn, are supplied to a frequency divider 59 that divides by four to produce 20,000 μs. pulses. The dividers 56 and 59 are similar to the divider 52 except for the difference in circuit constants.

The 20,000 μs. pulses may be passed through a clipping circuit 60 and supplied over a conductor 61 to a square wave generator 65 (Fig. 1), such as an Eccles-Jordan oscillator, for obtaining a square wave C (Fig. 4) having a repetition period of 40,000 μs. This square wave is then passed through a cathode follower tube 15 and from it are obtained, by means of suitable wave shaping and delay circuits described hereinafter, the desired driving or synchronizing pulses for the horizontal fast-sweep deflection.

The 20,000 μs. pulses are also supplied over a conductor 62 and through a "bucket" capacitor 63 (Fig. 2) of the first count subtraction circuit to a station selection switch 64; they are also supplied to the second count subtraction circuit through a coupling or blocking capacitor 66 of large capacity to a second station selection switch 67 which is ganged with the switch 64 as indicated by the broken line 68, the two switches being operated by the knob 65′.

At the switch 64, alternate switch contact points are connected to the feedback conductor 26 whereby at these switch point positions the 20,000 μs. pulses are fed back to the divider 16 to subtract counts. It may be desirable because of distributed or stray leakage in the switch 64 or capacitor 63 to connect the switch arm 64 to ground through a 1 megohm resistor 55 to permit charges to leak off.

At the switch 67, the last six switch contact points are connected in pairs, the three pairs of contact points #2–#3, #4–#5 and #6–#7 being connected through "bucket" capacitors 71, 72 and 73, respectively, to the feedback conductor 49 which leads to the second count subtraction circuit. Thus, with switch 67 in any one of the last six positions, 20,000 μs. pulses are applied to the divider 33 to subtract counts.

The cathode ray of tube 139 is deflected horizontally by either a slow-sweep or a fast-sweep deflecting wave that is in synchronism with the 40,000 μs. square wave from the Eccles-Jordan oscillator 65 (Fig. 1).

COUNT SUBTRACTIONS FOR STATION SELECTION

Referring now more particularly to the feature of subtracting counts for the purpose of station selection, specific pulse repetition rates for a plurality of pairs of ground transmitters stations will be used by way of example to aid in explaining the operation.

It will be assumed that the first pair of ground stations transmit the A pulses with a repetition period of 40,000 μs. and transmit the B pulses with a like repetition period; that the second pair of ground stations transmit A and B pulses having a repetition period of 39,900 μs.; that the third pair transmits 39,800 μs. pulses; that the fourth pair transmits 39,700 μs. pulses, etc. It is apparent that for station selection at the receiving apparatus, the operator must be able to select corresponding repetition periods for the output of the square wave generator 65 which controls the cathode-ray deflection cycle; namely, periods of 40,000 μs.; 39,900 μs.; 39,800 μs.; 39,700 μs.; 39,600 μs.; etc.

It will be noted that the several repetition periods differ from each other by 100 μs. or by integral multiples thereof, and that this corresponds to repetition period differences of 50 μs. or integral multiples thereof at the output of the frequency divider chain, i. e., at the input of the clipper 60. Therefore, the desired repetition period can be obtained by shortening the 20,000 μs. period by 50 μs., by 100 μs., by 150 μs., etc.

For example, to obtain the 39,900 μs. repetition period the switches 64 and 67 are moved to the #1 switch contact points. At this switch position the 20,000 μs. pulses from the lead 62 are fed back by way of the "bucket" capacitor 63, the switch 64 and the conductor 26 to the frequency divider 16 only. Upon the occurrence of a 20,000 μs. pulse, it produces a pulse of current through the "bucket" capacitor 63 and through the diode 23 to add a charge to the storage capacitor 21. At the end of the pulse, the capacitor 63 discharges through the diode 24 to its original potential. By properly selecting the capacity value of the "bucket" capacitor 63, the added charge is made equal to the charge which is added to the capacitor 21 by a single 50 μs. pulse. Thus, the 20,000 μs. pulse causes the blocking oscillator 22 to fire one pulse earlier or 50 μs. sooner than it normally would whereby the desired repetition period of 19,950 μs. at the clipper 60 or 39,900 μs. at the output of the E-J oscillator 65 is obtained. It may be noted that, in the example given, each time a 20,000 μs. pulse occurs, the divider 16 divides by one instead of by two.

To obtain the 39,800 μs. repetition period, the switches 64 and 67 are moved to position #2. Now the 20,000 μs. pulses are applied through the "bucket" capacitor 71 to the divider 33 and upon the occurrence of a 20,000 μs. pulse it applies a charge to the capacitor 39 through the diode 48. At the end of the pulse the capacitor 71 discharges through the diode 47 to its original potential. The capacitor 71 is given a capacity value such that this charge applied by the 20,000 μs. pulse is equal to the charge applied by a single 100 μs. pulse. Thus, upon the occurrence of a 20,000 μs. pulse the blocking oscillator 41 fires one pulse early or 100 μs. sooner than it normally would whereby the desired repetition period of 19,900 μs. is obtained at the clipper 60 and a repetition period of 39,800 μs. is obtained at the output of the E-J oscillator 65. It may be noted that in the example given, the divider 33 divides by four instead of by five upon the occurrence of each 20,000 μs. pulse.

To obtain the 39,700 μs. repetition period, the switches 64 and 67 are moved to the #3 position, this being the switch position shown in the drawing. Now the 20,000 μs. pulses are applied to both the divider 16 and the divider 33 through the switches 64 and 67 whereby both dividers lose a count. Specifically, the blocking oscillators 22 and 41 of dividers 16 and 33 fire 50 μs. and 100 μs. early, respectively, or a total of 150 μs. early. Thus, the desired repetition period of 2×19,850 μs. or 39,700 μs. is obtained at the E-J oscillator output.

To obtain the 39,600 μs. repetition period, the switches 64 and 67 are moved to the #4 position. Again, the 20,000 μs. pulses are applied to the divider 33 only, but this time through the capacitor 72 which has a capacity value such that a 20,000 μs. pulse causes the divider 33 to lose two counts, i. e., to trigger 200 μs. early. Thus, the desired period of 2×19,800 μs. or 39,600 μs. is obtained at the E-J oscillator.

At the #5 switch position, the divider 16 again triggers 50 μs. early and the divider 33 triggers 200 μs. early, or a total of 250 μs. for the two dividers. Thus, the repetition period is 19,750 μs. at the input to clipper 60 or 39,500 μs. at the output of the E-J oscillator 65.

At the #6 switch position, only the divider 33 receives the 20,000 μs. pulses. These pulses are applied through the capacitor 73 which is adjusted to make the divider 33 lose three counts. Thus, it triggers 300 μs. early to give a repetition period of 2×19,700 μs. or 39,400 μs. at the E-J oscillator output.

At the #7 switch position, both of the dividers 16 and 33 lose counts, divider 16 triggering 50 μs. early and divider 33 triggering 300 μs. early, or a total of 350 μs. whereby the repetition period is 19,650 μs. at the clipper 60 or 39,300 μs. at the E-J oscillator output.

It may be preferred to employ a different group of repetition periods than the group of 40,000 μs., 39,900 μs., etc. assumed above. By making the final divider stage 59 divide by three, for example, instead of by four, the divider chain output pulses have a repetition period of 15,000 μs. so that a group of repetition periods of 30,000 μs., 29,900 μs., etc. may be employed. Or the divider stage 59 may be made to divide by five to obtain a group of repetition periods of 50,000 μs., 49,900 μs., etc.

In order to obtain a more rapid right "drift" of the A and B pulses in the preliminary steps of obtaining a time difference reading, it may be desirable to provide a capacitor 95 that may be connected by a switch 96 to the coupling capacitor 66 so that by closing the switch 96 additional counts will be lost by the divider 33. Thus, the A and B pulses may be drifted toward the right by closing the switch 96. When the switch 96 is opened the A and B pulses stop drifting and again are stationary.

CATHODE RAY TRACE PRESENTATION

Before describing that portion of the receiving apparatus of Fig. 1 to which the control pulses from the pulse generator unit are applied, reference will be made to Fig. 4.

Figure 4:
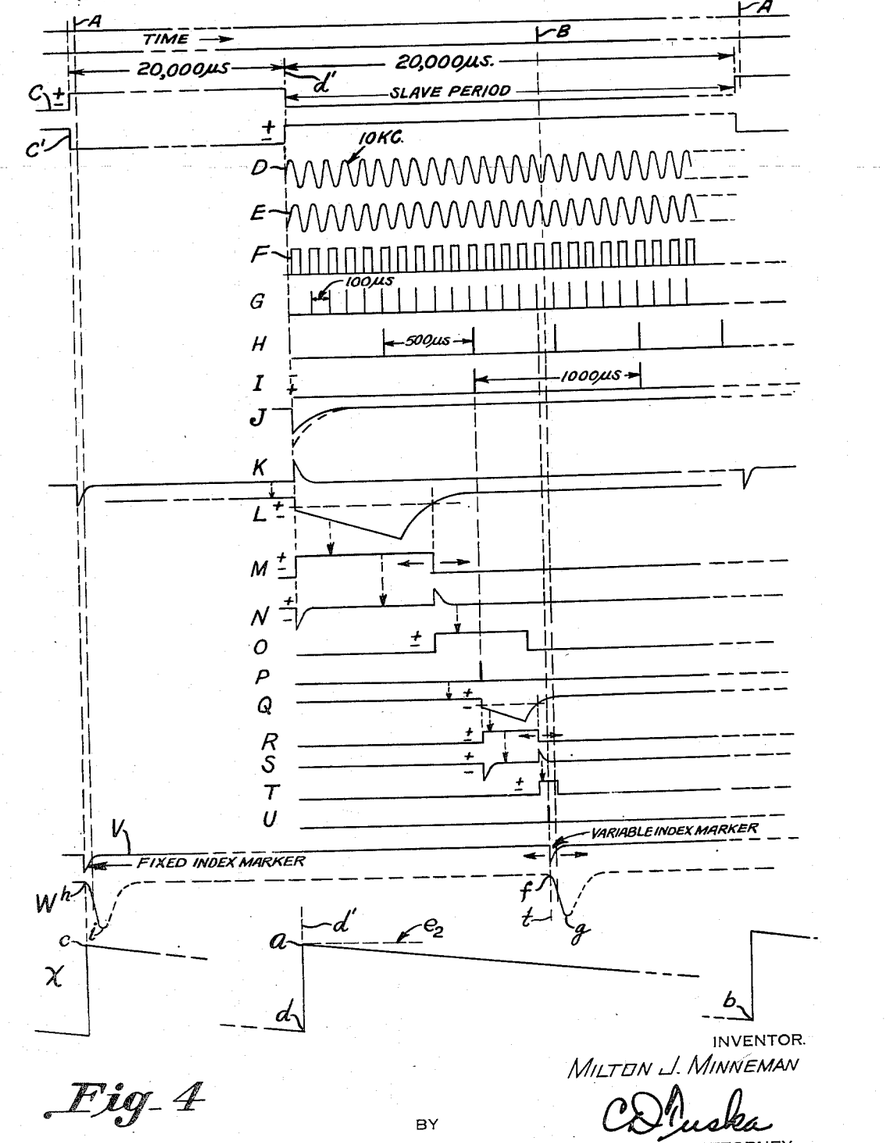
Figure 4 is a group of graphs which are referred to in explaining the operation of the system shown in Fig. 1.

In Fig. 4, the graphs X and W show the wave shapes of the slow-sweep and fast-sweep horizontal deflecting waves, respectively, for obtaining the desired cathode-ray traces. The wave V comprises a pair of recurring pulses; the second of which (referred to as the variable index marker) is adjustable in time and determines the starting time $t$ of the wave $f$—$g$ of the graph W. The starting time $t$ of the variable index marker in relation to the fixed index marker may be adjusted by adjusting a sine wave phase shifter 100 by a knob 100' and by adjusting two delay circuits 101 and 102 by knobs 101' and 102' (Fig. 1), as will be explained hereinafter, for aligning the A and B pulses. Three switching positions identified as positions #1, #2 and #3 are used successively in aligning the A and B pulses. It will be understood that while the pulses A and B and their corresponding fast-sweep traces appear alternately on the cathode-ray tube screen, they appear to the eye to occur simultaneously because of persistence of vision, lag of phosphorescence of the screen or both.

As shown in Fig. 4, the B pulse is the one that occurs after the mid-point of the A pulse period, and consequently the time interval, which elapses between the occurrence of a B pulse and the succeeding A pulse will be less than one half pulse interval. As will be seen in Fig. 4, the start of one fast sweep ($h$—$i$) coincides with the start of a slow trace, while the start of the other fast sweep ($f$—$g$) coincides with the variable index marker.

As already explained a momentary change of the recurrence rate will change the location of the pulses on the trace. Specifically, it is possible for the operator to locate the A pulse at the left side of the upper slow trace, which in turn will cause the B pulse to fall on the lower trace, and the variable index marker may be made to coincide with the B pulse. Therefore, when the function switch is turned to position #2, the A pulse will occur during the trace described by the fixed fast-sweep deflecting wave $h$—$i$, while the B pulse will occur during the trace described by the variable fast-sweep deflecting wave $f$—$g$.

A finer adjustment will permit the operator to align the A and B pulses so that the time elapsed between the start of the respective fast sweeps and the corresponding pulses are equal and occurs during the expanded parts of the traces, thereby providing good accuracy for determining the time delay. This feature is claimed broadly in copending application Serial No. 560,648, filed October 27, 1944, now Patent No. 2,430,570, issued November 11, 1947, in the name of George D. Hulst, Jr., and entitled Radio Navigation System.

In the present system, after the A and B pulses have been aligned with the receiver switched successively to operating positions #1, #2 and #3, the desired time difference or time interval is read off the veeder-root counters 103, 104, and 105 (Fig. 1) which indicate, respectively, microsecond units, hundreds of microseconds, and thousands of microseconds. It will be apparent that the time interval thus obtained is the amount that the starting time $t$ of the variable index marker has been delayed in time with respect to the mid-period $d'$ (Fig. 4) of the deflecting wave cycle in order to align the A and B pulses.

It may be noted that the upper fast trace $h$—$i$ (illustrated in Fig. 7) is produced by the first fast-sweep wave $h$—$i$ of the deflecting wave W. The lower fast trace $f$—$g$ (Fig. 7) is produced by the second fast-sweep wave $f$—$g$ of the deflecting wave W.

DESCRIPTION OF CATHODE RAY TRACE PRODUCING CIRCUITS, ETC., OF FIG. 1

Before describing in detail the means for shifting the variable index marker, this means and other portions of the receiver system as illustrated in Fig. 1 will be described generally.

Referring to Fig. 1 and to the graphs of Fig. 4, the output of the 20,000 $\mu$s. blocking oscillator is supplied over a conductor 61a and through a polarity reversing transformer 60a and a lead 61b to a slow-sweep deflecting circuit 115 for producing a sawtooth voltage wave X.

The output of the clipper 60 is supplied over a lead 61 to the Eccles-Jordan oscillator 65 whereby it is triggered by the 20,000 $\mu$s. pulses supplied thereto to produce a rectangular voltage wave which appears unchanged at the output of a cathode follower tube 15 as the wave C.

To produce the fast-sweep deflecting wave W, the wave C is supplied over a conductor 198 to a differentiating circuit 105 to produce a pulse 105A that appears later as the fixed index marker of the wave V.

The circuit for producing the variable index marker of wave V will now be described generally with reference to Figs. 1 and 4. It will be described in detail hereinafter with reference to the circuit diagram of Fig. 5. As previously indicated, it is the wave V that is applied to the fast-sweep deflecting circuit 122 for producing the fast-sweep wave W.

*General description of circuit for producing the variable index marker*

Referring to Figs. 1 and 4, the wave C is supplied from the cathode follower tube 15 to a clamp tube circuit 108 which applies a wave C' to a 10 kilocycle key oscillator 109. The oscillator 109 always starts up in a definite phase relation with respect to the front edge of the positive half cycle of wave C' to produce the 10 kc. sine wave D. This positive half cycle period is the one during which the pulse B occurs and is referred to as the slave period. The wave D is supplied to a cathode follower tube 111 and appears unchanged at its output.

Next the wave D is passed through a sine wave phase shifter 100 which may be of the goniometer type, and the phase shifted signal E is passed through a limiter 112 to produce the rectangular pulses F. The pulses F are applied to a blocking oscillator 113 which produces the pulses G having a 100 microsecond repetition rate. The oscillator 113 triggers on the front edges of the rectangular pulses F so that the pulses G occur practically simultaneously with said front edges. It is evident that shifting the phase of the wave E results in a shift in the timing of the pulses G.

The pulses G are applied to a 5 to 1 frequency divider 114 to obtain the pulses H having a 500 $\mu$s. repetition rate. The pulses H, in turn, are applied to a 2 to 1 frequency divider 116 to obtain the pulses I having a 1000 $\mu$s. repetition rate. The 1000 $\mu$s. pulses I are applied to a pulse selector circuit 120 where a particular pulse is selected as explained hereinafter.

Also, 100 $\mu$s. pulses G are supplied from the blocking oscillator 113 over a conductor 117 to a pulse selector circuit 118. At the selector 118, one of the 100 $\mu$s. pulses of wave G is selected by means of a gate pulse T (Fig. 4). The selected pulse is represented by the wave U and is supplied over a conductor 119 to the mixer 106. The mixed waves U and 105A pass through a clipper 121 and appear as the wave V which drives the fast-sweep deflecting circuit 122 to produce the wave W.

By selecting a particular 100 $\mu$s. pulse and by shifting the timing of the selected pulse by means of the phase shifter 100, it is possible to adjust the timing of the variable index marker precisely and to determine precisely by a direct reading what the timing is. The microseconds from 0 to 99 may be read from the counter 103 which is mechanically connected to the shaft of the phase shifter 100.

The microsecond readings in hundreds and in thousands are obtained from the counters 104 and 105 that indicate the settings of the delay circuits 102 and 101. These delay circuits comprise part of the gate producing circuit that supplies the gate pulse T by means of which the desired 100 $\mu$s. pulse is selected at 118.

Reference to the graphs of Fig. 4 will show that the first 100 $\mu$s. pulse of the wave G occurs upon the occurrence of the second pulse of the wave F. Specifically, the blocking oscillator 113 is not permitted to trigger in response to the occurrence of the first pulse of wave F with phase shifts approaching 360°. The reason for this will be explained hereinafter. This result is accomplished by utilizing a wave shaping circuit 125 that is referred to as a blocking oscillator delay circuit. The circuit 125 has the wave C applied to it which it converts to the wave J.

The wave J is a negative pulse of adjustable amplitude and is applied to the blocking oscillator 113 so as to keep it blocked during the occurrence of the first pulse of the wave F. In order to adjust the amplitude of the pulse J as the phase of the wave F is shifted, an adjustable element of the oscillator delay circuit 125 is mechanically coupled to the rotor shaft of the phase shifter 100. This will be explained more fully with reference to Fig. 5.

Referring now to the portion of the circuit that selects the desired 100 $\mu$s. pulse by means of the gate pulse T, the wave C from the cathode follower 15 is supplied over a lead 126 to a clipper and differentiator circuit 127 to produce the wave K. The wave K is applied to the coarse delay circuit 101 to trigger it on the positive pulse of the wave K. The delay circuit 101 in the example illustrated is a phantastron, the details of which will be described hereinafter with reference to Fig. 5.

The output of the phantastron 101 is the wave L which is passed through a clipping amplifier 128 to produce the rectangular wave M. The back slope of the wave L and, therefore, the back edge of the wave M may be adjusted by means of the knob 101' to vary it over a wide timing range. The wave M is differentiated by a differentiating circuit 129 to produce the wave N. The positive pulse of the wave N triggers a rectangular pulse producing circuit 131 to produce a gate pulse O.

The gate pulse 0 is applied to the pulse selector circuit 120 where a particular 1000 μs. pulse represented by the wave P is selected. Any desired 1000 μs. pulse may be selected by adjusting the delay circuit 101 and thereby shifting the position of the gate pulse 0 along its time axis. The selected pulse P is applied over a conductor 132 to the fine delay circuit 102 which, preferably, is also a phantastron. Its output represented by the wave Q is passed through a clipping amplifier 133 to produce the rectangular wave R. The timing of the back edge of the wave R may be adjusted by means of the knob 102' of the delay circuit 102. The wave R is differentiated by a circuit 134 to produce the wave S which is applied to a rectangular pulse producing circuit 136. The positive pulse of wave S triggers the circuit 136 to produce the gate pulse T which is applied to the pulse selector circuit 118.

The gate pulse T may be shifted along its time axis by adjusting the delay circuit knob 102' so that any desired 100 μs. pulse of wave G lying between successive 1000 μs. pulses of wave I may be selected. The selected 100 μs. pulse is represented by the wave U and is applied over lead 119 to the mixer 106 and the clipper 121 to produce the variable index marker (of wave V) which determines the start of the fast-sweep wave f—g.

From the foregoing it will be seen that sweep wave f—g can be adjusted or timed to align the A and B pulses by:

(1) Adjusting the knob 101' to select a 1000 μs. pulse,
(2) Adjusting the knob 102' to select a 100 μs. pulse, and
(3) Adjusting the knob 100' to shift the phase of the selected 100 μs. pulse.

It should be noted that an adjustment of the phase shifter 100 will never shift the selected 100 μs. pulse out of coincidence with the gate pulse T. The reason for this is that the gate pulse T is shifted along its time axis whenever the 100 μs. pulses are shifted in phase due to the fact that the selected 1000 μs. pulse is shifted in phase with the 100 μs. pulses, and due to the fact that a phase shift in the selected 1000 μs. pulse causes a shift in the pulse R which, in turn, causes a shift in the phase of the gate pulse T.

*Description of mixer 106, etc.*

Figures 6, 7, 8, 9, 10:
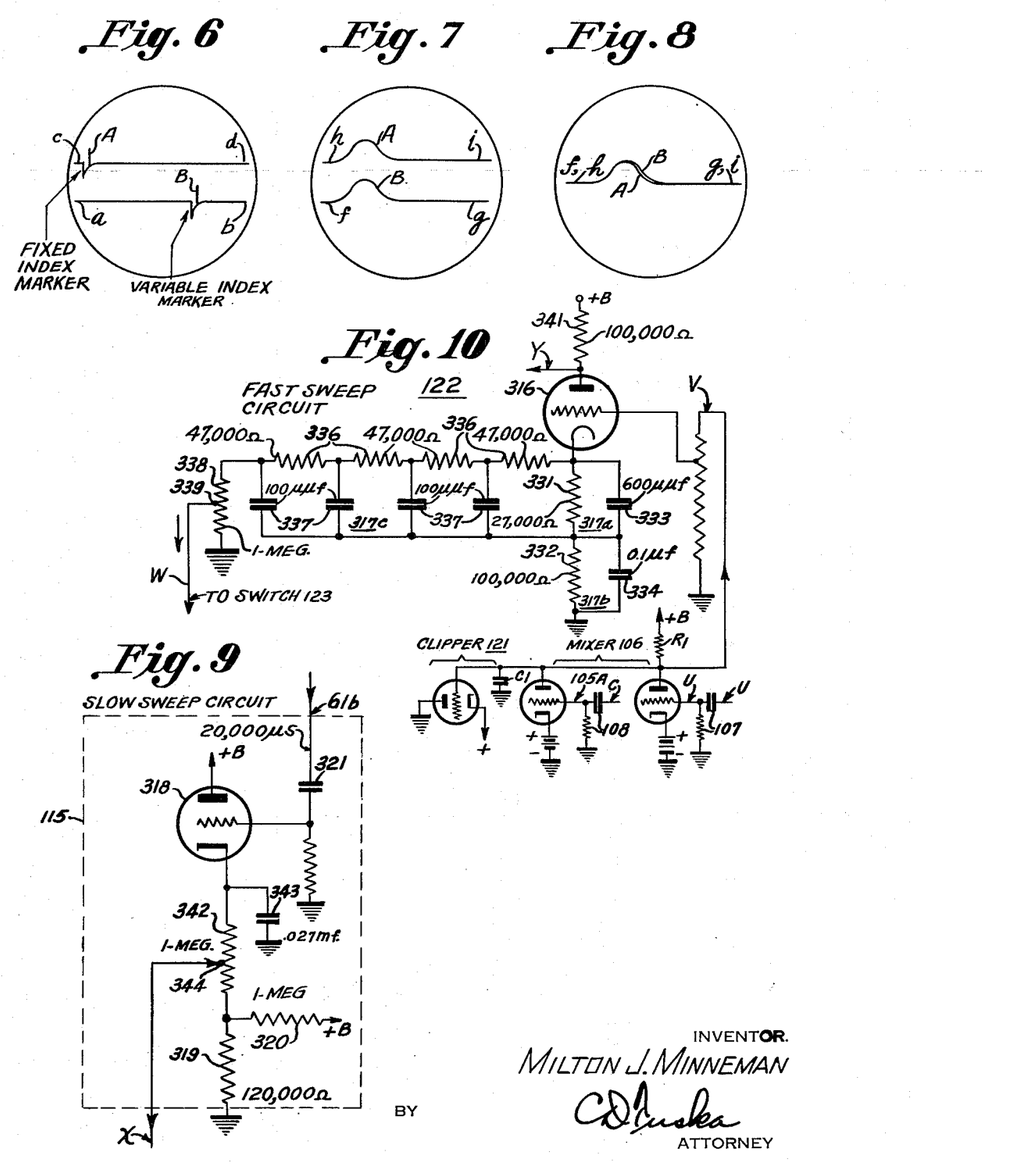
Figure 6 is a view of the slow-sweep cathode-ray traces appearing on the screen end of the cathode-ray indicator tube that is included in the apparatus of Fig. 1 and of the received pulses A and B as they appear on the traces when they are "aligned"
Figure 7 is a view of the fast-sweep cathode-ray traces on the cathode-ray tube indicator and of the received pulses A and B as they appear on the two fast-sweep traces, respectively, during the next step in obtaining more exact alignment of the A and B pulses.
Figure 8 is a view showing the fast-sweep traces of Fig. 7 superimposed or collapsed for the final alignment step and showing the A and B pulses exactly aligned and superimposed.
Figures 9 and 10 are circuit diagrams of the horizontal deflecting slow-sweep and fast-sweep circuits, respectively, employed in the system of Fig. 1.

Referring to Figs. 1 and 10, the mixer circuit 106 and the clipping circuit 121 function to clip off the negative pulses of the wave 105A and to mix the remaining clipped positive pulses with the pulses U. Thus, the wave V is obtained at the output of the clipper-mixer combination. The mixer 106, which may consist of two vacuum tubes having a common anode resistor as shown in Fig. 10, reverses the polarity of the pulses. The waves in the plate circuit of the mixer 106 are of equal amplitude due to operation of the tubes in a condition where grid and plate voltage approach equal amplitude. The width of the differentiated incoming pulses is short compared to that of the plate pulses, the width of the latter being controlled by a capacitor-resistor combination in the plate circuit and therefore being independent of the width of the incoming wave. This capacitor-resistor combination comprises a capacitor C1 and the plate resistor R1.

The wave V is supplied to the fast-sweep deflecting circuit 122 shown in detail in Fig. 10 and described hereinafter. The narrow negative pulses of wave V produce the fast-sweep wave W having the useful deflecting portions h—i and f—g. The deflecting waves W and X are applied from the circuits 122 and 115 through a wave selecting switch 123 and through a horizontal deflecting amplifier 124 to the horizontal deflecting plates 138 of the cathode-ray indicator tube 139. As described in copending application Serial No. 589,320, now Patent No. 2,445,361, issued July 20, 1948, filed April 20, 1945, in the names of Garrard Mountjoy, George D. Hulst, Jr., and Earl Schoenfeld and entitled Radio Navigation System, the horizontal deflecting amplifier 124 may be provided with a switch (not shown) for changing the bias on the amplifier tubes when the function switch is changed from the slow-sweep position to the fast-sweep position and vice versa, thereby insuring optimum efficiency and undistorted gain from the amplifier tubes.

The switch 123 has three contact points and three corresponding switch positions, referred to as operating positions, which are identified, reading clockwise, as positions #1, #2, and #3.

There are four other operation position switches, described hereinafter, that likewise have these three switch positions and which are ganged with the switch 123.

Switch 123, when in operation position #1, functions to apply the slow-sweep wave X to the horizontal deflecting plates 128 and, when in operation positions #2 and #3, functions to apply the fast-sweep wave W to the deflecting plates 128.

*Production of variable index marker description of circuit diagram (Fig. 5)*

Figure 5:
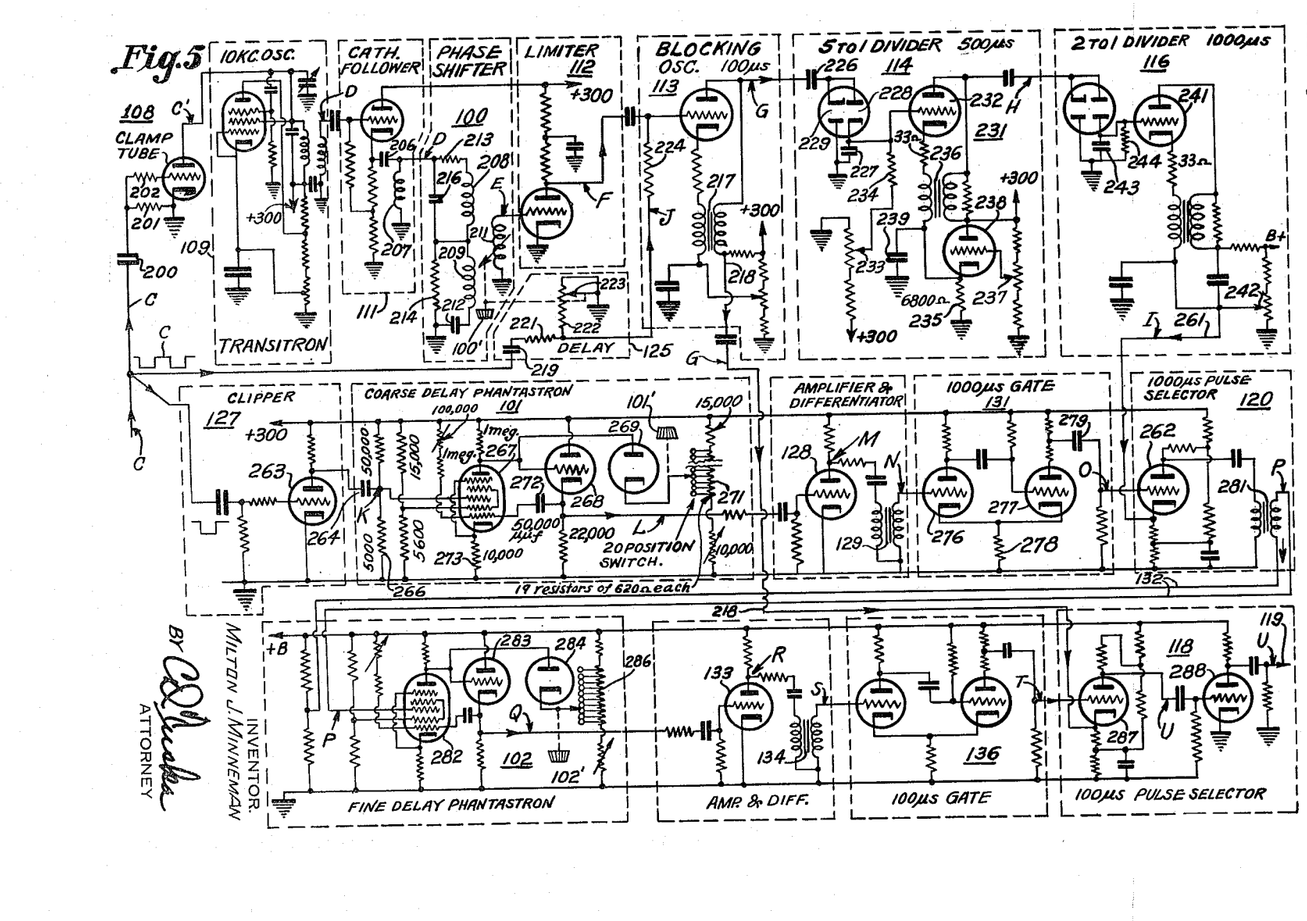
Figure 5 is a circuit diagram of a portion of the system shown in Fig. 1.

Referring to Fig. 5, the clamp tube 108 is a means of controlling the voltage supplied to the anode and screen of the oscillator 109. During the positive half cycle of the wave C a large current is drawn by the anode of 108. During the negative half cycle no anode current is drawn. This produces the waveform C'.

The positive half cycle of the wave C' (Fig. 4) is applied to the transition oscillator 109 as its operating voltage and keys the oscillator to make it start oscillating upon the occurrence of the positive half cycle. Thus the 10 kc. sine wave D is produced. The oscillator does not oscillate during the negative half cycle of the wave C'.

An important feature of the oscillator 109 is that, when keyed on, it always starts in the same phase so that the timing of the wave D with respect to the wave C' is always the same. The circuit and operation of the transition oscillator are well known and are described, for instance, in the Proceedings of the I. R. E. for February 1939, vol. 27, page 88. Another suitable type of oscillator is the resistor-capacitor oscillator described in Patent 2,373,737, issued April 17, 1945, to Maurice Artzt.

The wave D is applied from the cathode follower 111 to the phase shifter 100 by way of a coupling capacitor 206 and a coupling impedance coil 207. The purpose of the coil 207 is, in conjunction with phase shifter 100, to present a resistive impedance to the cathode of 111.

The phase shifter 100 is of the goniometer type and is designed as described and claimed in copending application Serial No. 677,450, filed June 18, 1946, now Patent No. 2,442,097, issued May 25, 1948, in the name of Stuart W. Seeley and entitled Electrical Networks for Phase Shifters. The coils 208 and 209 are the crossed stator coils of a goniometer, and the coil 211 is the rotor coil of the goniometer.

The stator or cross coils 208 and 209 are included in two branches or arms with four branch network. The two branches include coils 209 and 208 and also include a capacitor 212 and a resistor 213 respectively.

A third branch of the network comprises a resistor 214 which is connected in parallel with the branch 209, 212. The resistor 214 has the same resistance as resistor 213, and this resistance is equal to the reactance of the capacitor 212 at the frequency of the signal source.

A fourth branch of the network includes a capacitor 216 of the same value as the capacitor 212, this branch being in parallel with the branch 208, 213.

The above described four branch network supplies current to the coil 208 that is displaced 90° with respect to the current flowing through the coil 209. For reasons set forth in the Seeley application the circuit is not adversely affected to any great extent by changes in the ambient temperature.

The phase shifted sine wave E has both positive and negative half cycles clipped by the limiter 112 to produce the wave F which triggers the blocking oscillator 113, thus producing the 100 μs. pulses G. The oscillator 113 is of a well known type having transformer feed-back coupling, shown at 217, from the anode circuit to the cathode circuit. 100 μs. pulses G are supplied from the anode of the tube of oscillator 113 to the frequency divider 114. Also, 100 μs. pulses G are supplied from the +B side of the primary of the transformer 217 over a conductor 218 to the pulse selector 118.

The oscillator delay circuit 125 for producing the wave J is a differentiating circuit consisting of a capacitor 219 and resistors 221 and 222 in series therewith. A shorting tap 223 on resistor 222 is coupled to the rotor of phase shifter 100 so that as the first pulse of wave F is shifted to the right on the time axis, the amplitude of the pulse J is increased. The wave J is applied with negative polarity through a resistor 224 to the grid of the tube of oscillator 113. So long as the pulse J holds this grid negative a certain amount, the oscillator 113 will not be triggered by the wave F.

The reason for the above-described use of the pulse J is that without it the oscillator 113 might not stay locked in on the correct triggering pulse of wave F as the phase shift approaches a full 360° shift. That is, the blocking oscillator might jump from a lock-in on the desired pulse to a lock-in on an adjacent earlier pulse, for example, the first pulse of wave F.

The frequency dividers 114 and 116 may be of any suitable type. In the example illustrated they are of the same general type employed in the timer chain of dividers (Fig. 2) but with the blocking oscillators of the type using anode circuit to cathode circuit coupling. Also, certain circuit improvements will be apparent from the following description.

The frequency divider 114 comprises the well known counter section comprising a small capacity capacitor 226 and a large capacity storage capacitor 227. Capacitor 227 receives a certain charge through a diode section 228 each time a 100 μs. pulse occurs. At the end of the 100 μs. pulse the capacitor 226 discharges through the diode section 229. In the present 5 to 1 divider, the occurrence of the fifth 100 μs. pulse raises the charge on capacitor 227 to a value that triggers the blocking oscillator 231 to produce a pulse of wave H. At the same time the storage capacitor 227 is discharged through the grid-cathode impedance of the blocking oscillator tube 232.

The point at which the oscillator 231 triggers is determined in part by the setting of a bias tap 233, the bias being applied through a leak resistor 234.

The anode circuit of tube 232 is feed-back coupled to the cathode circuit by a transformer 236. The blocking oscillator is biased so that it is not free running, this biasing being adjustable both at the tap 233 and at a tap 237. Adjustment of the tap 237 adjusts the bias on the grid of a cathode follower tube 238 and the cathode of the tube 238 assumes a like bias, thus setting the bias of the cathode of the oscillator tube 232. A cathode follower is used so as to eliminate the use of a high resistance voltage divider to control the bias of the blocking oscillator.

The input impedance of the cathode of the cathode follower tube 238 has a low resistance so that no substantial voltage can build up across the by-pass capacitor 239, which in the example illustrated has a capacity of 0.1 microfarad. Otherwise the triggering time of the oscillator 231 might vary due to some biasing voltage being built up across the by-pass capacitor 239 during the 20,000 μs. period that the divider 114 is producing the 100 μs. pulses.

The frequency divider 116 is similar to the divider 114 but has no bias voltage applied to the grid of the oscillator tube 241, the adjustable cathode bias controlled by the tap 242 providing sufficient adjustment. Also, it will be noted that here the cathode follower tube is omitted, the bias being applied directly from the tap 242 to the cathode of the oscillator tube 241.

The storage capacitor 243 of the counter circuit is shunted by a leak resistor 244 of 6.8 megohms in the present example. This permits any charge left on the capacitor 243 at the end of a 20,000 μs. slave period (the keyed on period) to leak off before the next slave period occurs. Otherwise, at the start of a "keyed on" or slave period the capacitor 243 might have a charge on it due to the occurrence of one 500 μs. pulse immediately following the triggering of the oscillator 241, this one 500 μs. pulse being the last occurring pulse in the preceding "keyed on" or slave period. The resistor 234 performs a similar function in the divider 114.

The 1000 μs. pulses from the divider 116 are supplied with negative polarity over a conductor 261 to the cathode of a vacuum tube 262 comprising the pulse selector 120. The gate pulse O is supplied with positive polarity to the grid of the tube 262 whereby a 1000 μs. pulse P is passed by the tube 262 if the gate pulse O is made coincident therewith.

The gate pulse O is produced as follows. Some of the E-J signal C is supplied to the clipper 127 comprising an amplifier tube 263 that is driven hard enough to further square up the wave C. This squared-up wave is applied from the anode of the tube 263 through a differentiating circuit comprising a capacitor 264 and a resistor 266. The resulting wave K appears across resistor 266 and the positive pulse thereof triggers the coarse delay phantastron 101 to produce the wave L at its output.

The phantastron 101 comprises a pentagrid tube 267, a triode 268 and a diode 269 connected as shown. The output wave L is taken off the cathode of tube 268 and has a linear descending portion having a duration that is determined by the point or tap on a control potentiometer 271 to which the cathode of the diode 269 is connected. Thus, the position of the back edge of the wave L is determined by adjusting the knob 101'.

The phantastron circuit is described in Electronics for May 1946, pages 142 and 143.

The operation of the phantastron delay circuit may be described as follows:

1. *Initial conditions or stage VI.*—In the static condition of the phantastron tube 267, grid No. 1 is at cathode potential and no current flows to the plate of the tube. Electron flow to the plate is blocked by grid No. 3 which is at a less positive potential than grid No. 2. This sets up a negative field between grids No. 2 and No. 3, which blocks electron flow past grid No. 3 by counteracting the accelerating positive field from the cathode and grid No. 1 to grid No. 2. Therefor, tube current flows to grid No. 2 under control of grid No. 1. The plate potential is set by the control potentiometer 271 connected to the plate of tube 267 through the diode 269. The voltage drop in the high-plate resistor of tube 267 holds the plate voltage at essentially the value to which the control potentiometer is set.

2. *Sage I.*—A positive pulse is applied to grid No. 3 so that the blocked electrons may flow past grid No. 2 to the plate. The rising plate current causes a falling plate potential which is coupled back to grid No. 1 via the coupling capacitor 272, producing regenerative feedback. This results in a rapid reduction in plate and grid potential to the point at which a further drop would tend to cut off plate current and cause plate voltage to start rising again. This stops the regenerative action and blocks further fall in grid No. 1 voltage. The drop in plate and grid voltage and the time involved is essentially independent of the starting voltage of the plate, set by the control potentiometer 271. It is important to note that as soon as the phantastron tube plate voltage drops below the level of the cathode voltage of the diode 269, the diode ceases to conduct and does not load down the phantastron plate circuit.

3. *Stage II.*—At the end of stage I, grid No. 3 has lost control of plate current flow and control is exerted by grid No. 1 in the normal fashion. Since grid No. 1 is tied to B+, it attempts to rise exponentially toward B+ as the coupling capacitor 272 discharges. However, since grid No. 1 is now controlling plate current, the plate voltage drops and opposes the grid voltage change through the coupling capacitor. This negative feedback reduces the rate at which grid No. 1 can rise and makes the rate of change essentially linear. The linearity is also improved by the negative feedback developed across the cathode resistor 273. At the same time that grid No. 1 is rising, the cathode and grid No. 2 are rising and falling respectively, approaching the point at which grid No. 3 can again block plate current. Since the point at which control of plate current switches back from grid No. 1 to grid No. 3 is fixed by the constants of the circuit, the period during which negative feedback produces a linear rate of fall of plate voltage is a direct function of the starting plate voltage, set by the control potentiometer 271. The rate at which grid No. 1 voltage rises and plate voltage falls is largely determined by the values of the grid No. 1 resistor, the coupling capacitor 272, and the amplification of the tube 267.

4. *Stage III.*—At the end of stage II, the cathode has risen and grid No. 2 has fallen sufficiently to permit grid No. 3 again to assume control of plate voltage. During the time that control of plate current is switching from grid No. 1 to grid No. 3, the plate current levels off and does not change appreciably as grid No. 1 continues to rise. This eliminates the negative feedback and permits grid No. 1 to rise more rapidly as the plate voltage fall ceases. This constitutes stage III. The duration of stage III is fixed by the constants of the circuit and is not affected by the static plate voltage.

5. *Stage IV.*—At the end of stage III, grid No. 3 starts cutting off plate current flow, causing the plate voltage to rise. The rising plate voltage couples back to grid No. 1, speeding up the action and again providing positive or regenerative feedback. The cathode and grid No. 1 rise rapidly to their original levels, grid No. 2 drops to its static level, and plate current ceases to flow. This constitutes the end of the time delay interval since the jump in cathode voltage is used as the terminating point in the cycle. The duration of stage IV is essentially constant, fixed by the constants of the circuit.

6. *Stage V.*—At the end of stage IV, the plate voltage of the phantastron tube 267 does not immediately return to its initial static stage value, although plate current ceased to flow. This situation exists because of the stray capacitors from the plate to ground. The return of the phantastron plate voltage to its static level at the end of stage IV is delayed only a negligible amount by the charging of tube and wiring capacitance. At the end of stage V, the circuit has returned to the initial stage and awaits another trigger pulse.

7. *Summary of phantastron operation.*—The time delay interval consists of stages I, II, III, and IV. The duration of stages I, III, and IV is small and is fixed by the constants of the circuit. The duration of stage II depends in linear fashion upon the plate voltage of the phantastron tube 267 at the start of the cycle. There is, therefore, a linear relationship between the voltage applied by the control potentiometer 271 and the total delay time. The output of the circuit is the negative, square-type voltage wave L with variable trailing edge developed at the cathode of tube 268. In general, this must be amplified and differentiated to obtain a variable delay pulse. An advantage of the circuit in addition to the linear relationship between control voltage and delay time is the fact that it is relatively insensitive to slight changes in supply voltage. The controlling voltages to the various tube elements are all derived from the same B+ supply and the effect of changes in the supply is largely self-compensating.

The wave L from the phantastron 101 is applied to the grid of the amplifying and clipping tube 128 to produce the rectangular wave M having a back edge that may be shifted along the time axis by means of the knob 101'. The wave M is passed through the transformer 129 which applies the resulting differentiated wave N to the grid of the tube 276 in the gate pulse producing circuit 131.

The gate circuit 131 is a cathode coupled multivibrator that goes through one cycle of operation when triggered and then is inactive until again triggered. It comprises the tube 276 and a tube 277, the tubes having a common cathode resistor 278. The positive pulse of wave N triggers the gate circuit 131 to produce the gate pulse O at the anode of the tube 277. The pulse O is then applied through a coupling capacitor 279 to the 1000 $\mu$s. pulse selector 120.

It will be evident that by operating the delay control knob 101', the gate pulse O may be shifted in phase or timing so as to select any desired one of the 1000 μs. pulses I. Such a selected pulse P is supplied through a transformer 281 and over conductors 132 to the fine delay phantastron 102.

The phantastron delay circuit 102 comprises a pentagrid tube 282, a triode 283, a diode 284 and a control potentiometer 286. The delay control knob 102' operates a 10-position switch for connecting the cathode of the diode 284 to any one of ten taps on the potentiometer 286. The circuit of the fine delay phantastron 102 is the same as that of the coarse delay phantastron 101 except for the change in circuit constants required for producing the precise phase shift over the smaller time range through which the fine delay phantastron operates.

The wave Q from the phantastron 102 is passed through an amplifier and clipper tube 133 to obtain the rectangular wave R. The wave R is then differentiated by the transformer 134 to produce the wave S. The positive pulse of wave S triggers the circuit 136 to produce the gate pulse T. The circuit 136 is similar to the gate circuit 131 but has different circuit constants so as to produce a narrower gate pulse.

The gate pulse T is applied with positive polarity to the grid of the tube 287 of the 100 μs. pulse selector 118. The 100 μs. pulses G are applied by way of conductor 218 to the cathode of the tube 287 with negative polarity. Thus, any desired 100 μs. pulse such as the pulse U may be passed through the pulse selector 118 by making the gate pulse T coincident with the desired 100 μs. pulse.

The pulse U is amplified by an amplifier tube 288 and supplied over conductor 119 to produce the variable index marker of the wave V as previously described.

While the coarse delay circuit 101 and the fine delay circuit 102 have been shown and described as phantastron circuits, it should be understood that while they are preferred circuits at the present time they may be replaced by delay multivibrators if desired. Suitable delay multivibrators are well known in the art.

The wave V is supplied both to the fast-sweep circuit 122 and to the upper vertical deflecting plate 368 of the tube 139. The connection for supplying wave V to deflecting plate 368 is by way of a conductor 383, a switch 350, a resistor 384, the conductor 381 and the capacitor 382.

In Fig. 5 the values of certain circuit elements have been indicated, merely by way of example, in ohms, megohms, and micro-microfarads.

The fast-sweep deflecting circuit 122 that is driven by the wave V (comprising the fixed and variable marker pulses) to produce the fast-sweep wave W will now be described with reference to Fig. 10.

The fast-sweep circuit

Referring more specifically to the circuit 122 for producing the fast-sweep wave W, as shown in Fig. 10 the circuit comprises a vacuum tube 316 and a pulse shaping network that comprises two sections consisting of cathode resistors 331 and 332 shunted by capacitors 333 and 334, respectively, identified as network sections 317a and 317b. The shaping network further comprises a delay line section 317c comprising series resistors 336 and shunt capacitors 337 connected across the cathode resistor 331 and terminated in a resistor 338 and in the cathode resistor 332.

The fast-sweep wave W is taken off the resistor 338 through an adjustable tap 339, the setting of which determines the amplitude of the wave W.

In operation, the capacitors of the network sections 317a and 317b are charged through the anode resistor 341 and the tube 316 to a certain voltage level between successive pulses of the wave J to bring the tap 339 to the voltage $e_1$. Upon the occurrence of each negative pulse of the wave V, the tube 316 is driven to cut-off and the capacitors 333 and 334 discharge through the resistors 331 and 332, respectively. The section 317a comprising capacitor 333 and resistor 331 has a fast time constant whereby the discharge of capacitor 333 produces a voltage of steep slope across resistor 331. The section 317a comprising capacitor 334 and resistor 332 has a slower time constant whereby the discharge of capacitor 334 produces a voltage of less slope across resistor 332. These two voltages of different slopes appear at the tap 339 as the sum of the two voltages with the voltage of the steeper slope slightly delayed by the delay network section 317c.

The wave form of the wave W following the said slight delay is approximately logarithmic.

It should be understood that the fast-sweep wave W need not be of the wave form described and, in fact, may be linear although some form of increased expansion at the left end of the fast-sweep trace must be provided for the occurrence desired in the present embodiment of the invention. Such expansion may be obtained by employing either a logarithmic wave shape or an exponential wave shape, for example.

The above-described fast-sweep deflecting circuit is described and claimed in application Serial No. 583,255, now Patent No. 2,463,969, issued March 8, 1949, filed March 17, 1945, in the name of George D. Hulst and entitled Cathode Ray Deflection Circuit.

As previously noted, the starting time t of the fast-sweep wave f—g is determined by the adjustment of the 100 μs. pulse U (and in turn by the variable index marker of wave V) whereby the start of the wave f—g may be made to precede the received B pulse by the same amount that the start of the wave h—i precedes the received A pulse, this being the condition of alignment of the A and B pulses. It should also be noted that the wave f—g is identical with the wave h—i whereby exact alignment of the A and B pulses on the cathode-ray traces is obtained (as shown in Fig. 8) when the above-described timing relation exists.

An improved fast-sweep circuit described and claimed in copending application Serial No. 674,184, now Patent No. 2,449,169, issued September 14, 1948, filed June 4, 1946, in the names of Paul F. J. Holst and Loren R. Kirkwood and entitled Deflecting Circuits, may be employed if desired.

The slow-sweep circuit

Referring more specifically to the slow-sweep deflecting circuit 115, as shown in Fig. 9, it comprises a vacuum tube 318 and a network in the cathode circuit that comprises a cathode resistor 342 that has an adjustable tap 344 thereon and which is shunted by a capacitor 343. Positive bias is applied to the cathode of the tube 318 by connecting the lower end of cathode resistor 342 to the junction point of a pair of bleeder resistors 319 and 320. This prevents the tube 318 from drawing current at the end of the sawtooth cycle so that flattening of the sawtooth wave is avoided.

The operation is as follows: Each time one of the positive 20,000 μs. pulses from the lead 61a is supplied through a polarity reversing transformer 60a (Fig. 1) and a lead 61b to the grid of the tube 318 by way of a coupling capacitor 321, the capacitor 343 is charged suddenly from the anode voltage supply through the tube 318 to a certain voltage level to bring the tap 344 to the voltage level $e_2$ (Fig. 4). At the end of each positive pulse, the capacitor 343 discharges slowly through the resistors 342 and 319 thus producing successively the slow-sweep sawtooth wave portion a—b and the sawtooth wave portion c—d at the tap 344.

In Figs. 9 and 10 the values of certain circuit elements have been indicated, merely by way of example, in ohms, megohms, microfarads and micro-microfarads.

The radio receiver

The A and B pulses from a pair of ground stations (Fig. 3) are received by a radio receiver of the superheterodyne type comprising a radio frequency amplifier indicated at 361, a converter 362, an I.-F. amplifier 363 and a second detector and video frequency amplifier 364. The A and B pulses are supplied with positive polarity over a conductor 366, a conductor 381 and a capacitor 382 to the upper vertical deflecting plate 368. Thus, the A and B pulses may be made to appear, as shown in Figs. 6, 7 and 8, on the horizontal cathode-ray traces. The A and B pulses are made to appear with equal amplitude on the cathode-ray tube screen by employing a differential gain control circuit described hereinafter.

Slow-sweep and fast-sweep trace separation

The slow-sweep traces a—b and c—d are separated as illustrated in Fig. 6 while the receiver is on the #1 operation position by means of the rectangular wave C (Fig. 4) supplied from the cathode follower tube 15 (Fig. 1) over a conductor 369 to the #1 contact point of a trace separation switch 371, and over a conductor 372 to the upper deflecting plate 368 of the cathode ray tube 139. Thus, the portion of the wave C, which is positive as it appears on the upper plate 368, holds the cathode ray deflection up a certain amount during the occurrence of the slow-sweep deflecting wave c—d.

The fast-sweep traces f—g and h—i are separated as illustrated in Fig. 7 during the #2 operation position also by means of the rectangular wave C.

Fast-sweep blanking

Blanking is provided so that only the traces f—g and h—i appear on the cathode-ray screen when in the #2 and #3 fast-sweep operating positions. This blanking is provided by means of the negative portions of the wave Y as it appears on the anode of the tube 316 (Fig. 10) of the fast-sweep deflecting circuit 122. The wave Y is supplied from the anode of tube 316 to the #2 and #3 contact points of a switch 321 whereby in the #2 and #3 operation positions, this wave is supplied over conductors 322 and 326 to the grid 327 of the cathode ray tube 139.

Trace brilliance control

The diode 324 is provided to control the brilliance of the traces on the cathode-ray tube screen by preventing changes in bias on the cathode-ray tube grid 327 due to the application of blanking pulses. A leak resistor 328 is connected across the diode 324 and the cathode of the diode 324 is connected to a variable bias voltage source (not shown).

In operation, during the periods that the blanking waves are positive at the anode of the diode 324, the impedance of the diode 324 is very low so that its anode is practically at the bias potential of its cathode. Thus, regardless of the form of the blanking wave and regardless of whether any blanking wave is being applied, the voltage on the grid 327 of the cathode ray tube during the cathode-ray sweeps is substantially the voltage on the cathode of the diode 324.

DIFFERENTIAL GAIN CONTROL CIRCUIT

A differential gain control circuit for the R.-F. amplifier 361 of the radio receiver preferably is provided, as shown in Fig. 1, for the purpose of keeping the amplitudes of the A and B pulses substantially alike at the receiver output, thus facilitating the A and B pulse alignment. The gain control circuit includes a resistor 343 connected between the anodes of the two tubes of the E-J oscillator 65. An adjustable differential gain balance tap on resistor 243 may be moved to either side of the center thereof to decrease the gain of the R.-F. amplifier 361 during either the reception of the pulse A or the pulse B. The voltage at the gain balance tap is supplied through a capacitor 344 and a resistor 346 to the anode of a diode 347 and to the #2 and #3 contact points of a differential gain control switch 348. Thus, when the receiver is on either the #2 or #3 operation position for pulse alignment on the fast sweeps, the differential gain control voltage is applied through the switch 348 and a conductor 349 to the gain control grid of an amplifier tube in the R.-F. amplifier 361.

The differential gain control operation with the receiver on either #2 or #3 operation position is as follows:

When the gain balance tap is at the center of resistor 343, no voltage wave is applied to the diode 347. When the tap is on one side of this center or balance position, a wave of one polarity is applied to the diode 347; when the tap is on the other side of the balance point, a wave of the opposite polarity is applied to the diode 347. The diode 347 functions to supply a negative bias during the negative half cycle following a positive cycle of an applied wave. For example, a positive half cycle causes diode current to charge capacitor 344a, and during the following negative half cycle the capacitor 344a discharges slowly through a resistor 351 connected across the diode 347 thus making the anode of diode 347 negative with respect to ground and reducing the gain of the I.—F. amplifier 362 while the B pulse (or the A pulse) is being amplified.

With switch 348 on the #1 operation position for pulse alignment, normal operating bias voltage −V is on the R.—F. amplifier 362.

PROCEDURE IN MAKING A TIME MEASUREMENT

The successive steps in making a measurement of the time interval between the A and B pulses from a pair of ground stations will now be described.

ALIGNMENT OF A AND B PULSES

Position #1

After a particular pair of ground stations has been selected with the receiver set on the #1 operation position, the A and B pulses will appear stationary on the two traces a—b and c—d. A suitable drift switch such as switch 96 (Fig. 2)

or knob 11 of oscillator 10 is operated to drift one of the pulses onto the upper trace c—d and over the fixed index marker at the left end of this trace. The other pulse will now appear on the lower trace a—b. The pulse on the trace c—d is the A pulse and the pulse on the trace a—b is the B pulse. That this is true will be evident by referring to the graphs of Fig. 4.

Next, the starting time t of the variable index marker of wave V is adjusted by operating the phase shift and delay controls 100', 101' and 102' of the phase shifter 100 and the phantastrons 101 and 102 (Figs. 1 and 5) to bring the variable index marker under the B pulse. The variable index marker is now carefully adjusted so that its position with respect to the B pulse is substantially the same as the position of the fixed index marker with respect to the A pulse.

*Position #2*

Next, referring to Fig. 7, the receiver is switched to the fast-sweep operation position #2 which results in the A and B pulses appearing on the traces h—i and f—g respectively. As shown in Fig. 4, the start of the variable index marker pulse of wave V determines the start of the second fast-sweep portion f—g of wave W, and the two starting practically simultaneously. By operating suitable drift switches such as the right-drift switch 96 (Fig. 2) or the knob 11 of the crystal oscillator 10, the A and B pulses are drifted to the left ends of the traces where they are on the more expanded portion of the fast sweeps. They are then closely aligned as shown in Fig. 7 by operating the knobs 100', 101' and 102' of the phase shift and delay circuits.

*Position #3*

The final alignment of the A and B pulses is done on operation position #3 with the two traces f—g and h—i superimposed as shown in Fig. 8. The front edges of the A and B pulses are now exactly aligned (they usually differ slightly in shape) by operating the knob 100' of the phase shifter 100. The time reading can now be made from the counters 103, 104 and 105.

For example, if the counters 105, 104 and 103 read 6, 8 and 42, respectively, the reading is 6842 microseconds.

I claim as my invention:

1. In a radio system wherein periodically recurring A pulses and B pulses are received from ground stations and wherein two similar deflecting waves, one of fixed timing and the other of adjustable timing, are to be produced for deflecting the cathode ray of a cathode ray tube indicator, said A pulses having the same repetition period as said B pulses, means for producing a square wave having the same repetition period as said A and B pulses, the half cycle of said square wave that occurs during the occurrence of a B pulse being identified as the slave period, means for producing a sine wave signal having a fixed phase with respect to said slave period, a phase shifter through which said sine wave signal is passed to obtain a phase-shifted wave, means for converting said phase-shifted wave to periodically recurring short-duration timing pulses, means for selecting a desired one of said timing pulses, and means for producing said adjustable deflecting wave in response to the occurrence of said selected pulse whereby said adjustable deflecting wave may be shifted to a desired position along a time axis by selecting a desired timing pulse and by shifting the phase of the selected timing pulse by said phase shifter.

2. The invention according to claim 1 wherein said means for producing a sine wave signal having a fixed phase with respect to the slave period comprises a sine wave oscillator of the type that always produces a sine wave signal starting in a definite phase relation in response to being keyed into an oscillatory condition and wherein said means further comprises keying means for keying said oscillator into an oscillatory condition simultaneously with the occurrence of said slave period and for the duration only of said slave period.

3. In a radio navigation system wherein periodically recurring A pulses and B pulses are received from ground stations and wherein a variable index marker is to be produced, said A and B pulses having the same repetition period, means for producing a square wave having the same repetition period as said A and B pulses, the half cycle of said square wave that occurs during the occurrence of a B pulse being identified as the slave period, means for producing a sine wave signal having a fixed phase with respect to said slave period, a phase shifter through which said sine wave signal is passed to obtain a phase-shifted wave, means for converting said phase-shifted wave to periodically recurring short-duration timing pulses, means for selecting a desired one of said timing pulses, and means for causing said selected pulse to produce a variable index marker which may be shifted to a desired position by selecting a desired timing pulse and by shifting the phase of the selected timing pulse by said phase shifter.

4. In a radio navigation system wherein periodically recurring A pulses and B pulses are received from ground stations and wherein a fixed index marker and a variable index marker are to be produced, said A and B pulses having the same repetition period, means for producing a square wave having the same repetition period as said A and B pulses, the half cycle of said square wave that occurs during the occurrence of a B pulse being identified as the slave period, means for producing a sine wave signal having a fixed phase with respect to said slave period, a phase shifter through which said sine wave signal is passed to obtain a phase-shifted wave, means for limiting said phase-shifted wave for producing rectangular pulses, means for converting said rectangular pulses to short-duration timing pulses, means for selecting a desired one of said timing pulses, and means for causing said selected pulse to produce a variable index marker which may be shifted to a desired position by selecting a desired timing pulse and by shifting the phase of the selected timing pulse by said phase shifter.

5. In combination, means for producing pulses having a certain repetition rate, means for producing other pulses having a repetition rate that is a submultiple of said first repetition rate, a pulse selector circuit to which said submultiple rate pulses are applied, variable delay means for producing a gate pulse that is applied to said selector circuit for selecting a desired one of said submultiple rate pulses, a second pulse selector circuit to which said first pulses are applied, a second variable delay means to which said one selected submultiple rate pulse is applied and comprising means for producing a pulse having a front edge that occurs in response to the occurrence of said one selected submultiple rate pulse and having a back edge that is adjustable in timing, means for producing a second gate pulse in response to the occurrence of said adjustable back edge, and means for applying said second gate pulse to said second pulse selector for selecting a desired one of said first pulses.

6. In a radio navigation system, means for producing pulses having a repetition period of 100 microseconds, means for producing other pulses having a repetition period of 1000 microseconds, a pulse selector circuit to which said 1000 microsecond pulses are applied, variable delay means for producing a gate pulse that is applied to said selector circuit for selecting a desired one of said 1000 microsecond pulses, a second pulse selector circuit to which said 100 microsecond period pulses are applied, a second variable delay means to which said one selected 1000 microsecond pulse is applied and comprising means for producing a pulse having a front edge that occurs in response to the occurrence of said one selected 1000 microsecond pulse and having a back edge that is adjustable in timing, means for producing a second gate pulse in response to the occurrence of said adjustable back edge, and means for applying said second gate pulse to said second pulse selector for selecting a desired one of said 100 microsecond period pulses.

7. In a radio navigation receiving system for measuring the time interval between two received radio pulses A and B, the A pulse being transmitted at a periodic rate from a master ground station and the B pulse being transmitted at said periodic rate from a slave ground station, means for producing a square wave having the same repetition period as said A and B pulses and having a master half cycle or period that occurs during the reception of said A pulse and having a slave half cycle or period that occurs during the reception of said B pulse, means including a frequency divider chain for producing timing pulses having a certain repetition rate and which are locked in with said square wave, means for obtaining from said divider chain other timing pulses having a repetition rate that is a submultiple of said first repetition rate, a pulse selector circuit to which said submultiple rate pulses are applied, variable delay means for producing a gate pulse that is applied to said selector circuit for selecting a desired one of said submultiple rate pulses, a second pulse selector circuit to which said first timing pulses are applied, a second variable delay means to which said one selected submultiple rate pulse is applied and comprising means for producing a pulse having a front edge that occurs in response to the occurrence of said one selected pulse and having a back edge that is adjustable in timing, means for producing a second gate pulse in response to the occurrence of said adjustable back edge, means for applying said second gate to said second pulse selector for selecting a desired one of said first timing pulses, means for simultaneously varying the phase or timing of said selected first timing pulse and said selected submultiple rate pulse, a cathode ray tube having a screen, a deflecting wave generator for producing a pair of deflecting waves which are applied to said tube to produce a pair of cathode-ray traces on said screen, means for applying said A and B pulses to said cathode ray tube whereby they appear on said two traces, respectively, means for producing one of said deflecting waves in a certain time relation to the start of said master period, and means for producing the other of said deflecting waves in response to the occurrence of said selected first timing pulse whereby the timing of said other deflecting wave may be adjusted to bring the A and B pulses appearing on said two traces into alignment.

8. In a radio navigation receiving system for measuring the time interval between two received radio pulses A and B, the A pulse being transmitted from a master ground station and the B pulse being transmitted from a slave ground station, means for producing a square wave having the same repetition period as said A and B pulses and having a master half cycle or period that occurs during the reception of said A pulse and having a slave half cycle or period that occurs during the reception of said B pulse, means including a frequency divider chain for producing pulses having a 100 microsecond repetition period, means for applying said square wave to said divider chain to make it active only in response to and during said slave period whereby said 100 microsecond period pulses always occur in a definite time relation to the start of said slave period, means for producing from said divider chain other pulses having a 1000 microsecond repetition period, a pulse selector to which said 1000 microsecond period pulses are applied, variable delay means for supplying a variable gate pulse to said pulse selector for selecting a desired 1000 microsecond period pulse, a second variable delay means to which said selected 1000 microsecond period pulse is applied, said second delay means comprising means for producing a gate control pulse in response to the occurrence of said applied 1000 microsecond period pulse, means for varying the timing of the back edge of said gate control pulse, means for producing a second variable gate pulse in response to the occurrence of said variable back edge, a second pulse selector circuit to which said second gate pulse is applied, means for supplying to said second pulse selector pulses from said frequency divider of 100 microsecond repetition period, whereby a desired 100 microsecond period pulse may be selected by varying the timing of said second gate pulse, means for varying the phase or timing of said selected 100 microsecond period pulse, a cathode ray tube having a screen, a deflecting wave generator for producing a pair of deflecting waves which are applied to said tube to produce a pair of cathode-ray traces on said screen, means for applying said A and B pulses to said cathode ray tube whereby they appear on said two traces, respectively, means for producing one of said deflecting waves in a certain time relation to the start of said master period, and means for producing the other of said deflecting waves in response to the occurrence of said selected 100 microsecond period pulse whereby the timing of said other deflecting wave may be adjusted to bring the A and B pulses appearing on said two traces into alignment.

9. In a receiver for a radio navigation system wherein an A pulse is transmitted from a master ground station and a B pulse is transmitted from a slave ground station, means comprising a timing oscillator followed by a chain of dividers for producing a square wave having a repetition rate corresponding to that of the received ground station pulses, the half cycle of the square wave that occurs during the occurrence of a B pulse being identified as the slave period, a cathode ray tube having a screen, means for producing a pair of slow-sweep traces on said screen, means for making the received A and B pulses appear on said traces, means for determining approximately the time difference between said A and B pulses while they appear on said slow-sweep traces, means for producing a pair of fast-sweep traces that occur during the duration of said A and B pulses, respectively, means for adjusting the timing of one of said fast-sweep traces for obtaining alignment of said A and B pulses as they appear on said fast-sweep traces, said last means comprising means for supplying a sine wave signal that always has a fixed phase relation with respect to the start of said slave period, a phase shifter through which said sine wave signal is passed to shift its phase, a pulse producing circuit to which said phase shifter output is applied to produce pulses having a 100 microsecond repetition period, a 100 microsecond pulse selector circuit to which said 100 microsecond pulses are applied, a frequency divider circuit to which said 100 microsecond pulses are applied for producing pulses having a 1000 microsecond repetition period, a 1000 microsecond pulse selector to which said 1000 microsecond pulses are applied, a coarse variable delay means for producing a gate pulse occurring once during each slave period and adjustable in timing, said gate pulse being applied to said 1000 microsecond selector circuit whereby a desired one of said 1000 microsecond pulses is selected, a fine variable delay means to which said selected 1000 microsecond pulse is applied for producing a gate pulse that may be shifted in time between successive 1000 microsecond pulses for selecting a desired 100 microsecond pulse, means for applying said last gate pulse to said 100 microsecond pulse selector whereby a desired one of said 100 microsecond pulses is selected, means for applying said selected 100 microsecond pulse to said fast-sweep trace producing means and for causing the one of said fast traces that occurs during a B pulse to start in response to the occurrence of said selected 100 microsecond pulse whereby exact alignment of said A and B pulses may be obtained by adjusting said coarse delay circuit, said fine delay circuit, and said sine wave phase shifter.

MILTON J. MINNEMAN.

REFERENCES CITED

The following references are of record in the file of this patent:

UNITED STATES PATENTS

| Number | Name | Date |
| --- | --- | --- |
| 2,403,600 | Holmes | July 9, 1946 |
| 2,405,238 | Seely | Aug. 6, 1946 |
| 2,423,523 | Shumark et al. | July 8, 1947 |
| 2,430,570 | Hulst | Nov. 11, 1947 |
| 2,432,158 | Hulst et al. | Dec. 9, 1947 |

OTHER REFERENCES

Electronic Industries, March 1946, pages 84–93, 126, 128, 130 and 132.